(12) United States Patent
Dombrowski et al.

(10) Patent No.: US 6,233,631 B1
(45) Date of Patent: May 15, 2001

(54) UPLOAD/DOWNLOAD OF AUDITRON INFORMATION TO PC OR PHONE LINE (75) Inventors: James J. Dombrowski; Craig S. Lippolis, both of Webster; Carl F. Oresick, Rochester; Kevin R. Mathers, Churchville; Alicia A. Campbell, West Bloomfield; Nicholas M. Lamendola, Lima; M. John Ludlow, Geneseo; Steven L. Holloway, Palmyra, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/207,070

(22) Filed: Dec. 7, 1998

(51) Int. Cl.[7] .............................. G06F 13/12; G06F 13/38; G06F 13/00
(52) U.S. Cl. .................................. 710/65; 710/5; 710/33; 710/65
(58) Field of Search ................................... 710/5, 33, 65, 710/100, 15; 709/301; 399/8

(56) References Cited

U.S. PATENT DOCUMENTS

| 5,038,319 | 8/1991 | Carter et al. ........................ 364/900 |
| 5,057,866 | 10/1991 | Hill, Jr. et al. ..................... 355/200 |
| 5,412,779 | * 5/1995 | Motoyama ............................... 399/8 |
| 5,452,356 | * 9/1995 | Albert ..................................... 380/9 |
| 5,495,595 | * 2/1996 | Peters et al. ......................... 709/300 |
| 5,537,554 | * 7/1996 | Motoyama ........................... 710/100 |
| 5,694,580 | * 12/1997 | Narita et al. ............................ 710/1 |
| 5,819,110 | * 10/1998 | Motoyama ............................. 710/15 |
| 5,835,789 | * 11/1998 | Ueda et al. ............................ 710/33 |
| 5,933,809 | * 8/1999 | Hunt et al. .............................. 705/3 |

FOREIGN PATENT DOCUMENTS

| 63-098054 | * 4/1988 | (JP) . |
| 05289846 | * 11/1993 | (JP) . |
| 11296510 | * 10/1999 | (JP) . |
| 92/06551 | * 4/1992 | (WO) . |

* cited by examiner

Primary Examiner—Thomas Lee
Assistant Examiner—Chun Cao
(74) Attorney, Agent, or Firm—Ronald F. Chapuran (57) ABSTRACT A method of providing machine usage data to a computer for a given user by setting the machine for transmission of the machine usage data to the computer and transmitting the machine usage data to the computer for various levels of usage. The computer converts the machine usage data into a format compatible for the given user, for example, converting to a generic ASCII type file format or to an MS Excel format.

5 Claims, 8 Drawing Sheets

UPLOAD/DOWNLOAD OF AUDITRON INFORMATION TO PC OR PHONE LINE

BACKGROUND OF THE INVENTION

The present invention relates to a user interface, in particular, to the ability of a machine to upload or download auditron data to a PC or phone line.

In the prior art systems for monitoring the operation of a plurality of reprographic machines from a remote source by use of a host computer having high level diagnostic capabilities are known. These systems have the capability to interact remotely with the machines being monitored to receive automatically initiated or user initiated requests for diagnosis and to interact with the requesting machine to receive stored data to enable higher level diagnostic analysis. Such systems are shown in U.S. Pat. Nos. 5,038,319, and 5,057,866 and incorporated herein by reference. These systems employ Remote Interactive Communications (RIC) to enable transfer of selected machine operating data to the remote site at which the host computer is located, through a suitable communication channel. The machine physical data may be transmitted from a monitored document system to the remote site automatically at predetermined times and/or response to a specific request from the host computer.

In a typical RIC system, the host computer is linked via a public switched telephone system or a combination of public and dedicated systems to local reprographic machines via modems. The host computer may include a compiler to allow communication with a plurality of different types of machines and an expert diagnostic system that performs higher level analysis of the machine physical data than is available from the diagnostic system in the machine.

It is also known in various prior art machines to have an auditron function. This function may restrict access to the machine to those customers that have accounts, and will also maintain a record of copies made on each "account." For non-networked machines, this information can be displayed on the User Interface, or in some cases formatted and sent to a printer that was supported by the machine. These types of data transfer were awkward, however. Many customers would prefer a database type of interface where the information could be more easily integrated into specific billing databases. Although this type of interface is offered for some networked machines via "CentreWare" a network software package, this type of interface is not available for non-networked (i.e. stand alone copiers).

To overcome this deficiency in the prior art, it would be desirable to offer the customer an opportunity to transmit data directly to PC's and then convert the data into a generic ASCII type file format that may be easily integrated into a preferred accounting system, such as into MS Excel format. This would be a significant timesaving to accounts that have specific computer based accounting systems. Most of these customers have been printing out the account information and hand typing it into their system.

An object of the present invention is to provide an Electronic Auditron with the capability to download and upload account information to a PC directly and also upload and download information to a PC remotely using a modem. It is another object of the present invention to be able to transfer a binary data file containing Auditron account information over the phone line between a PC and the stand along copier after the correct password has been entered. This binary file may be converted to an ASCII file, Microsoft Excel database, or other formats such as MS Access that can be easily integrated with the customers billing database software.

Other advantages of the present invention will become apparent as the following description proceeds, and the features characterizing the invention will be pointed out with particularity in the claims annexed to and forming a part of this specification.

SUMMARY OF THE INVENTION

The present invention is concerned with a method of providing machine usage data remotely or locally to a computer for a given user by setting the machine for transmission of the machine usage data to the computer and transmitting the machine usage data for various levels of usage. The computer converts the machine usage data into a format compatible for the given user, for example, converting to a generic ASCII type file format or to an MS Excel format. Uploading of data from a computer to the machine is also provided.

BRIEF DESCRIPTION OF THE DRAWINGS

For a better understanding of the present invention, reference may be made to the accompanying drawings wherein the same reference numerals have been applied to like and wherein.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention.

DESCRIPTION OF EMBODIMENT

Figure 1:
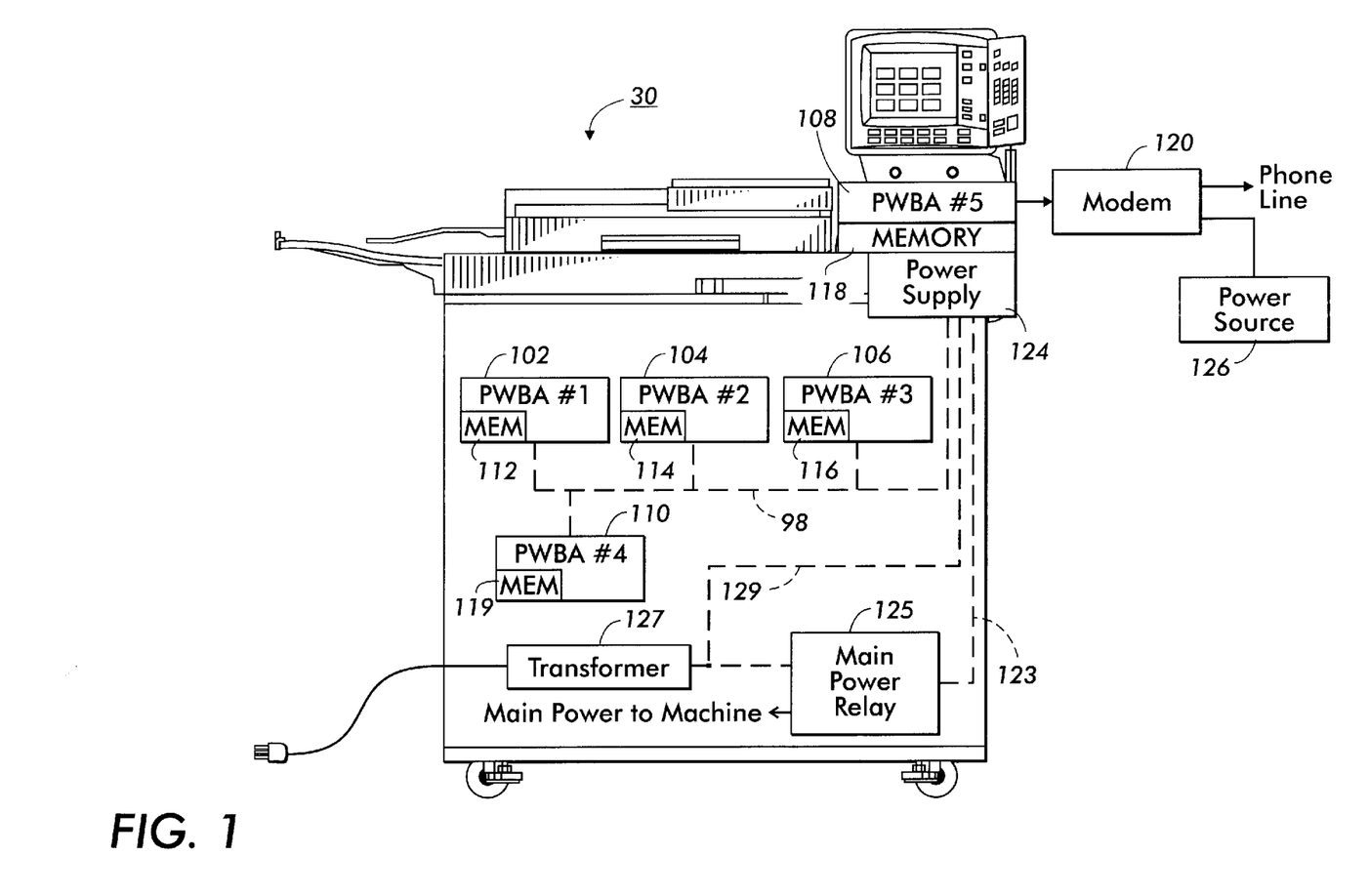
FIG. 1 illustrates a control architecture for a typical copier or printer machine illustrating the present invention.

With reference to FIG. 1, there is illustrated in general block form, the control of a typical machine such as a copier or printer. The machine 30 is controlled by a plurality of controller boards interconnected to a common channel or bus 98. For purposes of explanation, five controller boards, boards 102 with memory 112, 104 with memory 114, 106 with memory 116, 108 with memory 116, and board 110 with memory 119 are illustrated, with controller board 108 being the control for the user interface 36 and the remaining controller boards providing control for predetermined systems and components of the base machine 30. Controller board 108 is also provided with modem 120 for communication with a remote location, and is the master control for the other controller boards.

Controller board 108 also includes a discrete power supply 124 connected to a power source illustrated at 126, via modem 120. The controller board 108 controls the power sequencing for the other control boards, 102, 104, 106 and 110. Controller board 108 is also connected to main power relay 125 via control line 123 in turn connected to transformer 127 providing main power to the machine. Line 129 interconnecting controller board 108 and transformer 127 insures that power is on to the user interface when power to the machine is switched off. That is, because of the interconnections of the user interface control board 108 to the power source 126 and to the line 129, the board 108 is always on even when the power relay 125 shuts power off to the machine. Thus, If the control board 108 is connected to power source 126, it is possible to communicate or call to the machine 30 and transfer or read machine data stored in memory 118 when machine 30 power is "off". During operation of machine 30, the user interface board 108 reads diagnostic data from the other control boards 102, 104, and 106. The data is stored in memory 118 for transmission to a remote location over telephone lines or any other suitable medium when requested or at predetermined machine events.

Figure 2:
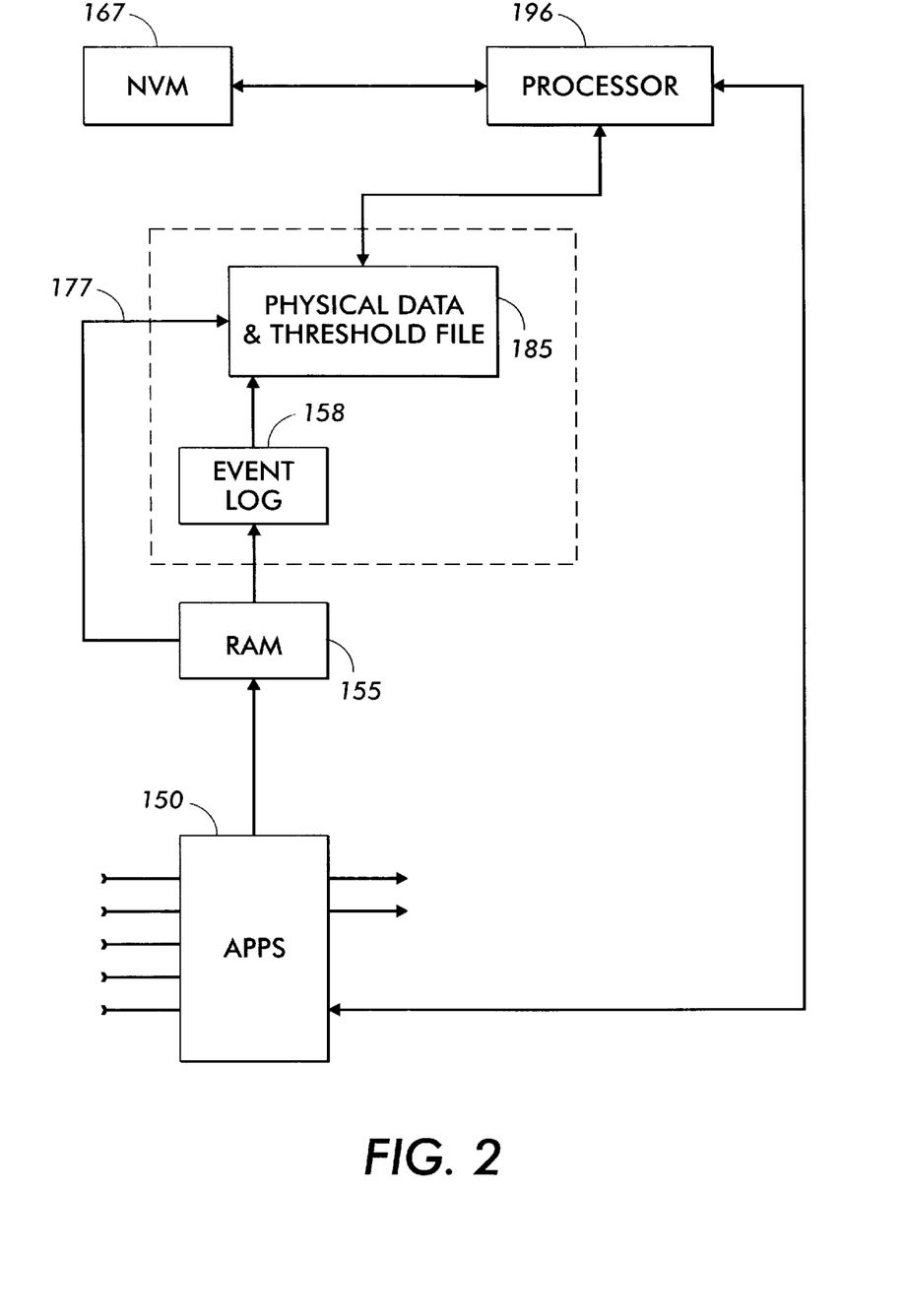
FIG. 2 illustrates a more detailed control block diagram of the controls of FIG. 1.

FIG. 2 illustrates in block form control elements of a typical controller such as shown in FIG. 2. Referring to FIG. 2, certain key machine operating events (such as current event data) which define the proper execution of the control system such as user interface buttons being set, changes in application software operating states, interlock switches opening and closing, notification of control or system faults, execution of key routines, etc., are input as they occur by the applications system software 150 under control of processor 196 to dynamic memory (RAM) 155. Also stored in RAM 155 (for later storage on non-volatile memory or stored on any other suitable memory are counts from specified auditron counters tracking machine usage by client or customer.

A data transfer means in the form of an event spooling routine in software, which is periodically called, writes the event data accumulated in the buffer of memory 155 into an event or occurrence logger file 158 for transmission to the physical data and threshold file 185.

Figure 3:
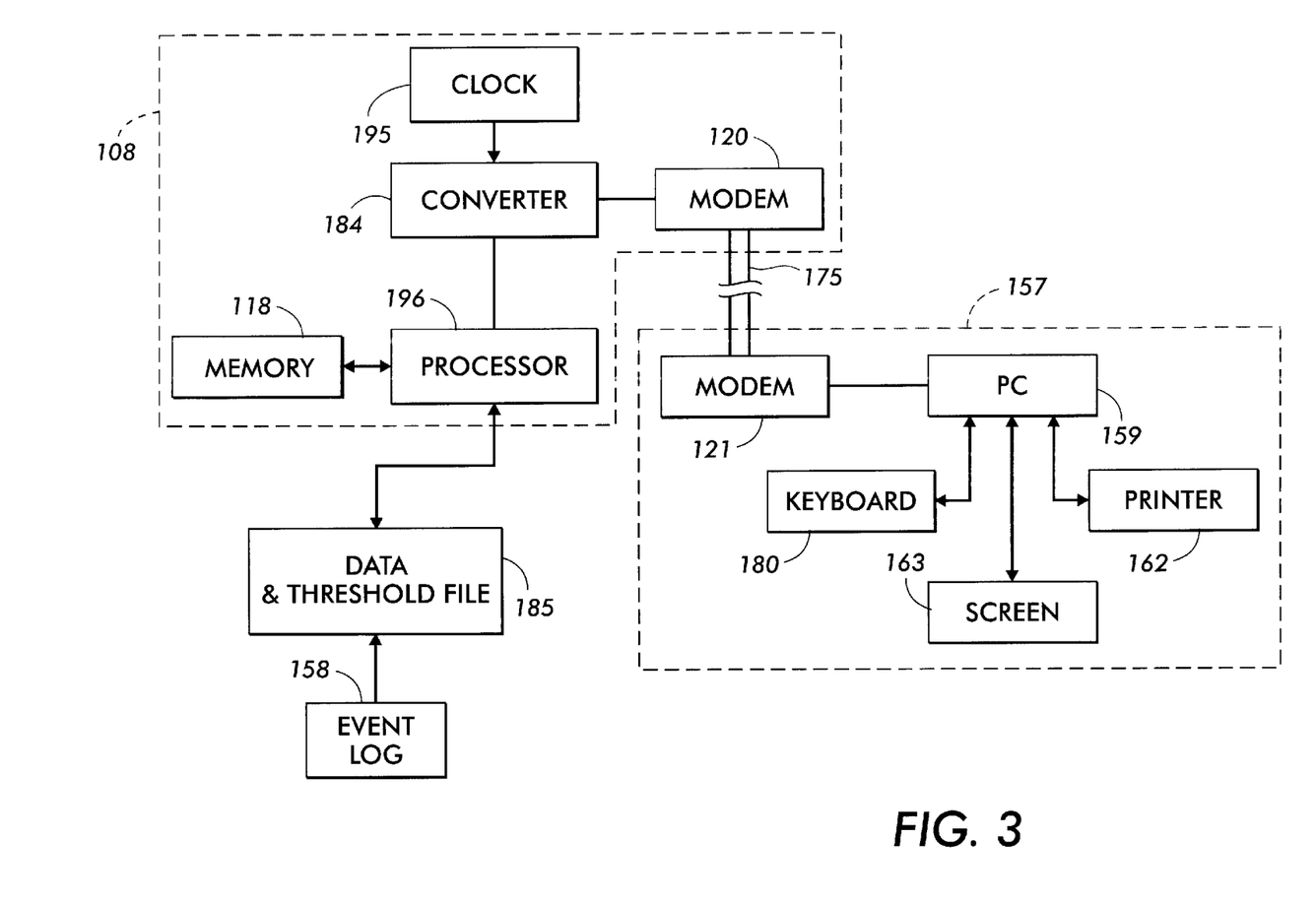
FIG. 3 illustrates the control of FIG. 2 connected to a remote host.

With reference to FIG. 3, there is shown a remote communication system including remote host 157 connected to machine 30 through a suitable channel such as telephone line 175 and modems 120, 121. Selected machine data is downloaded to remote host 157 by communicating between the host 157 and memory in machine 30 such as Data and Threshold File 185. Communication can be initiated by either remote host 157 or machine 30.

In accordance with the present invention, user interface control board 108 stores in memory 118 or any other suitable control board or memory various auditron data from file 185 or any other appropriate file for transmission to remote host 157. A computer such as PC 159 with keyboard 180, printer 162 and user interface with screen 163 can be provided at the remote host 157 for use in establishing communication with modems 121,120 for transmission of data from machine 30 via line 175 to host 157 and from host 157 to machine 30. A suitable data band width converter 184 of control board 108 converts data to the clock rate required for transmission over line 175, it being understood that the rate at which data is handled by machine 30 is ordinarily different and typically substantially greater than the data transmission rate of telephone line 175. In this regard, a clock 195 is connected to converter 184. The clock 195 is used to determine frequency of testing the state of the machine for possible transfer of an alert. Similar not shown converter and clock are provided with remote host 157.

The Electronic Auditron feature uses the User Interface to guide the operator through the process of diverting copy charges to specific accounts. A designated counter gets incremented for each copy successfully reaching its destination (including the duplex tray) to keep the total counts equal to those accumulated in the system's billing meters and to keep the counts as close as possible to "good copies." The total counts accumulated in the Electronic Auditron accounts shall be within 0.1% or 10 counts (whichever is greater) of the total accumulation in the meters for any 1 month period. A disabled account shall not accumulate counts.

The Electronic Auditron maintains compatibility with other Auditron functions. This compatibility includes operational modes, options, data access, capturing, display, and general functions performed by the E.A. administrator. The Electronic Auditron has the ability to associate Vectored Copy Limits (Top Stops) with accounts in the Controlled Access mode. The Electronic Auditron also downloads and uploads account information to a PC directly and also downloads information to a PC remotely using a modem.

The electronic auditron information stored in a machine can be exported to a personal computer (PC) that is attached to the machine User Interface RS 232 (1) port. Generally both the printer and the PC use the same port. Since the data that is sent to a PC may be edited and downloaded back to the machine, more fields will be sent to the PC than the printer.

If a PC is connected to the UI for data transmission, a customer communication NVM location must include a suitable value to enable the PC function. The printer options NVM location must be set (9600 baud) for proper operation. Both of these settings are modified by the service engineer. If the machine was previously set up for a printer, the baud rate could be set to 0 (1200 baud), but the PC may not perform at its optimum speed. The PC can accept data as a much faster rater than the printer.

Users will be able to initiate the transmission of data to a PC using an All Accounts Button on the transmit data screen. The Stop button on this screen will be used to end the PC data transmission. FIG. 3 illustrates the screen that contains the buttons to initiate data transmission.

When the machine is unable to communicate to the PC after the "All Accounts" button is pressed, in a specific embodiment a fault (Auditron PC No Answer) is declared. The message: "Data Transmission Communication Fault. Retransmission of all data is required. Press C to clear" will appear on the User Interface. This fault is logged and will clear with the C hard button or the soft Close button on the Transmit Data Screen.

Once the data transmission is initiated, the machine is in Standby mode until the transmission is complete. As soon as the button is pressed, the message "Data Transmission in Progress" will appear on the screen indicating the status of the transmission. During a transmission, no other buttons will have any effect on the process except the stop button. If the communication is lost between the PC and the UI, a fault will be declared (Auditron Communication Failure). The message: "Data Transmission Communication Fault. Retransmission of all data is required. Press C to clear." will appear on the UI. This fault will clear when the user presses the C button on the Control Panel or presses the Cancel button on the Transmit Data screen.

A Stop button is available on the Data Transmission screen if the user wants to halt the data transmission. Once this button is pressed, the transmission will end and a message will appear on the UI. The message will read "Data Transmission Stopped. Retransmission of all data is required." this message will clear when the Close, Non-Zero Account, or All Accounts button on the Transmit Data screen is pressed. The user must retransmit the information if a successful download is needed. When the transmission is completed, the transmission message will clear and another message indicating that the data transmission is complete will appear on the screen. This message will clear with the C or Clear All button.

The Standard X-modem Protocol will be used to transmit the Auditron information to the PC. The UI will transmit the data in 128 byte size packets. Error protection will be provided in the transmission to ensure that the data is intact. The same information is sent to the PC whether the machine is in an accounting or controlled access mode. The PC data will also contain the user numbers and the top stop vector value for each account. All data coming from the UI will be in an encoded binary format.

The User interface will first provide a header that identifies how the data will be set up for the PC software. The fields identified in this header are used such that the data size can vary. This will be useful for the Controlled Access mode where the User number length can change and for customers that use different NVM page allocations. Once the User Interface data is sent to a PC, the data will be displayed in a specific embodiment in a table on the Auditron PC software. Special Software on the PC will accept the Auditron data sent by the machine and convert the information into the PC application.

The software may have the capability to export this information into a specific set of Spreadsheet or Database applications such as Excel, Access, Foxpro, etc. A menu may be available so that the user can choose the application preferred for downloading data. The user can then edit this data and if needed, download it again to the machine. Available from the PC software by be the option to print out the data use a Reporting software.

From a remote location, via a modem, a user can retrieve the Electronic Auditron information and download this information to a PC. A modem is attached to the RS232 (1) port and a phone line at the customer site before the retrieval can take place. The modem will be HAYES compatible at a 9600 baud rate. The service engineer must set up the modem through an NVM location by selecting the baud rate and parity. A software module resident on the PC has the ability to communicate to the machine. The PC must also have a modem and the software will operate in a WINDOW environment. Similar to the export of data to the direct connect PC, the RIC protocol will be used to transmit the data to a remote PC.

When the program is executed to download to a remote computer the user will have the option of selecting a machine by serial number for communication with the user. Many machines can be resident on the screen, and the user can select the machine of choice. Stored in a separate location on the software, are the phone number and Auditron Administrator Password associated with a machine serial number. This information will be initially loaded in the PC software installation process. A separate screen is accessible to the customer that allows the editing of this information at any time or add additional machines.

Once a machine is selected, the user then presses an "Access All Data" or an "Access Non-zero Data" button on their application to connect to a machine and retrieve data. Depending on what button is pressed, the machine will provide All or only Non-Zero accounts. If the machine is in a standby state, the PC can dial into the machine using the pre-programmed machine information and access the Auditron data. The Auditron Administrator password that is entered in the machine information must match what is found on the Machine for successful communication to occur. If the passwords do not match, the message "Incorrect Access Code. Please check machine information and redial." will appear on the PC message window. When passwords do match and communication is allowed, the transmission of auditron data will begin. Status messages of the transmission will be provided in the message portion of the PC application.

When data is being accessed a message "Data Transmission in progress." will be displayed on the machine UI. Also, in a location on the UI, "PLEASE WAIT" will be displayed. The machine will be disabled during his transmission. Data cannot be accessed from the PC if the machine is powered off, or is in run mode. When the data cannot be accessed, a message "The data cannot be accessed at this time" will appear in a message window of the PC software application.

After the user has pressed one of the Access Data buttons and a successful logon has occurred data will be uploaded to the PC. The data that is obtained in the remote setup will be identical to the data that is obtained when it is connected directly to the machine table described in a direct connect download. The Serial number, or ID number will also be displayed at the top of the PC information.

The Remote PC software will have the capability to export information into a specific set of Spreadsheet or Database applications such as Excel, Access, Foxpro, etc. A menu is available so that the user can choose the application preferred for data download. The user can then edit this data and if needed, download it again to a given machine.

To avoid having to input all account information on a machine User Interface, the user can create all of these accounts in PC software application and send this data to the machine. Data can be sent to a machine from a PC that is connected directly to the RS232 (1) port on the UI. A software module may accept user data in a database or spreadsheet type format and convert this file into a HEX format for use by the UI. This will ensure that the data being sent to the machine is in a proper format for the UI. Similar to the upload software, this software will be Microsoft Windows compatible. The data download will be initiated from the machine UI.

Figure 4:
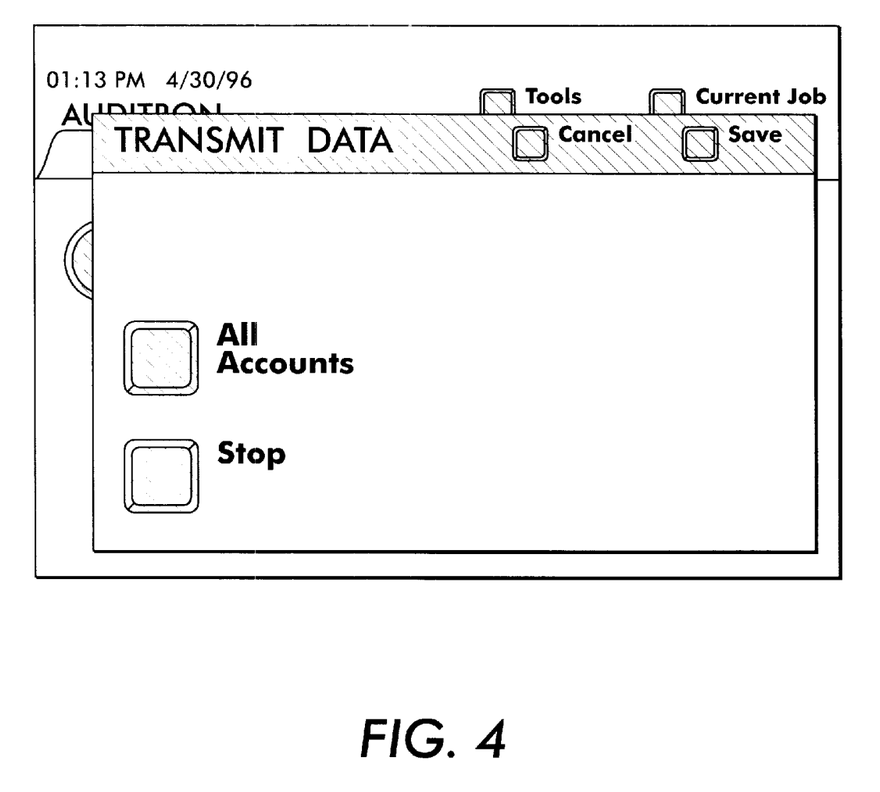
FIGS. 4 and 5 illustrate screen displays for implementing the present invention.
Figure 5:
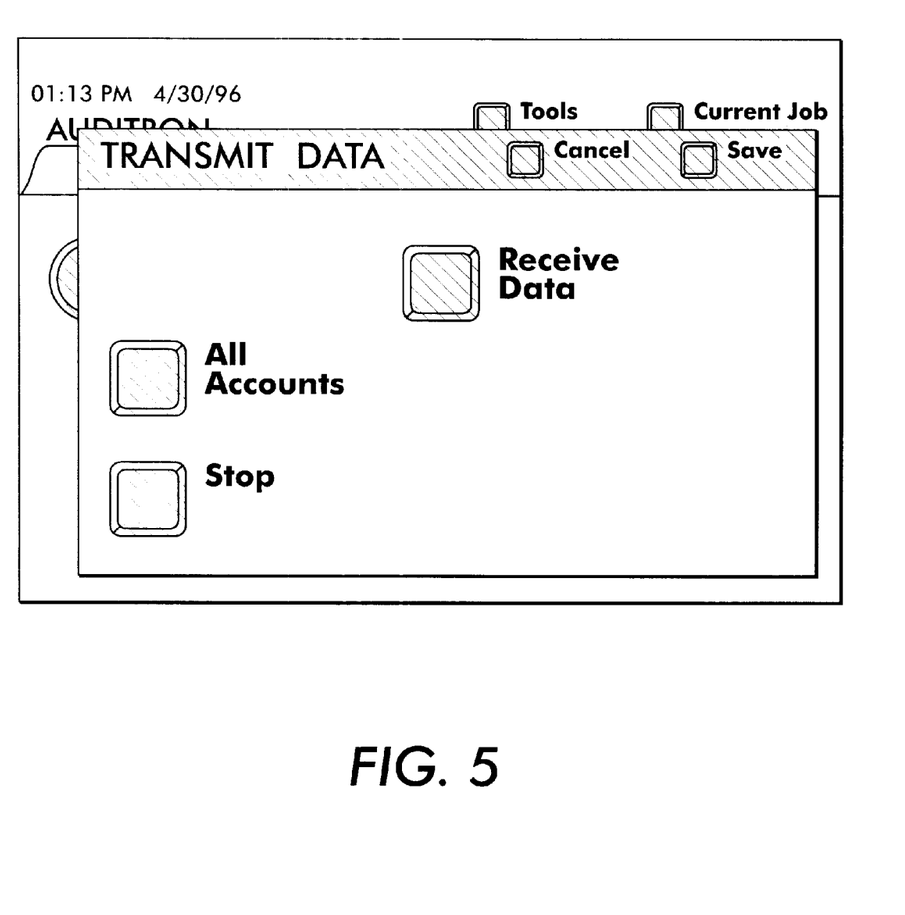

The User software resident on the PC allows the PC to communicate with the machine. From a menu, the user will be able to import a file that resides in another application such as Excel or Access. The PC software will provide a list of the applications or formats that can be accepted or converted into the machine environment. Before the user has to download data to a machine, the information can be viewed on a table that is similar to the import tables that are sent to a PC from the machine. The fields that will be downloaded to the machine will be: Account #, Copy Count, User Number, and other suitable identification numbers. The user will be able to download either Controlled Access or Accounting data from a button in the Transmit Data section of the Administrator Tools screen as seen in FIG. 4 below.

In a specific embodiment, a Service Engineer activates the download process and displays the "Receive Data" button by enabling an NVM setting. After the Receive Data button is pressed, a warning screen will pop up indicating to the customer "Existing Auditron data will be deleted. Select Yes to confirm to No to cancel." The user presses YES or NO. If yes is pressed, the transmission will begin. If no is pressed, the PC screen will display the Transmit Data screen.

As part of the download process, the PC must ensure that the UI is ready to accept data. If a Video Engine does not receive a response from the PC after the Receive Data and the YES confirmation buttons are pressed, a fault (AuditronPCNoAnswer) will be declared. The fault will clear when the user presses the C button on the Control Panel of the User Interface or presses the Cancel button on the Transmit Data screen. The message that appears on the UI after the fault occurs is: "Communication could not be established with the PC. The Data Transmission was unsuccessful. Press C to clear."

Once the transmission begins, a message will appear on the machine, "Data Transmission in progress." Also, a PLEASE WAIT message will be present on the User Interface. During this time, the machine will be disabled. The message will clear when the data transmission is complete, the soft Stop button on the UI is pressed, or the UI to PC connection is terminated for any reason. If for any reason, the communication is lost between the PC and the UI, a fault will be declared. The message: "Data Transmission Communication Fault. Retransmission of all data is required. Press C to clear." will appear on the UI. This fault will clear when the user presses the C button on the Control Panel or presses the Cancel button on the Transmit Data screen.

On the Auditron Data Transmission screen, there will be a soft Stop key that halts the data transmission. Once this button is pressed the transmission will end and a message will appear on the UI. The message will read "Data Transmission Stopped. Retransmission of all data is required." This message will clear when the Cancel, Save, or the Receive Data button has been pressed on the Transmit Data screen. The user must retransmit the information if a successful download is needed.

After a successful transmission has been made, the machine will put up the message: "Data Transmission Complete. Press C to clear." This message will be removed from the UI when C or the Clear All button is pressed.

For direct connect PCs only, the user will have the option to restore data that has been uploaded before a download takes place. This feature will be useful if the user has sent data, modified in an external application software, and decides to retain the original data or if a data download from the PC was unsuccessful. When this occurs, the data that was previously sent to the PC can be sent back to the machine.

Figure 6:
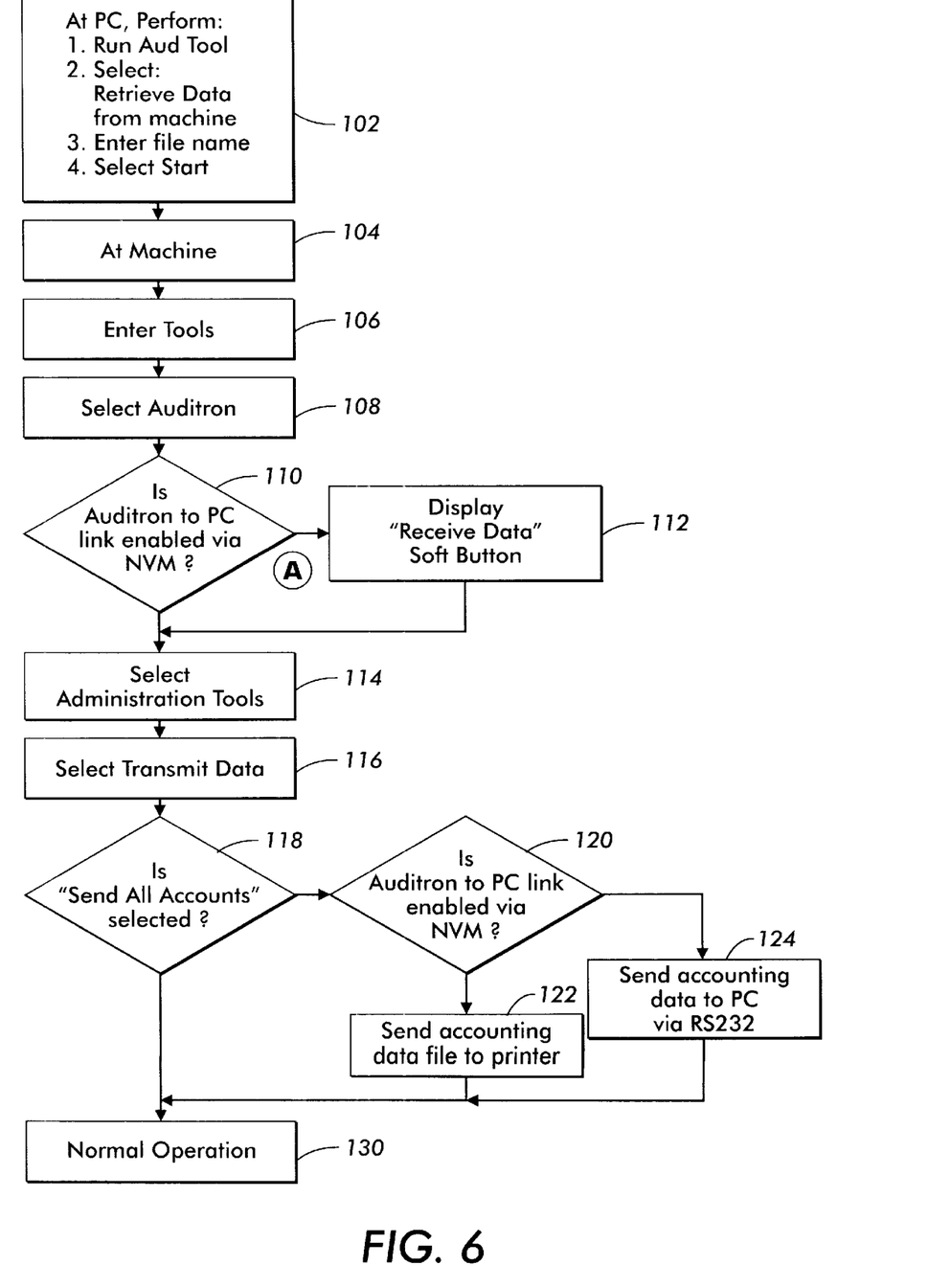
FIGS. 6–8 are flow charts illustrating the sequence of operation of the auditron in accordance with the present invention.

FIG. 6 illustrates a data transfer from a machine user interface to a PC. In particular, at block 102 there is illustrated the necessary steps at the PC, namely, run auditron tool, select, retrieve data from machine, enter filename, and select start. At the machine, as illustrated at block 104, there is initiated a sequence of operations, in particular, enter tools as shown at block 106 and select auditron as shown at block 108. At block 110 there is a determination whether or not there is an auditron to PC link enabled via NVM. If not, as illustrated in block 112 there is displayed a soft button "receive data" to enable the link. If the link is enabled via NVM, there is a step of selecting administration tools as illustrated in block 114 and select transmit data as shown in block 116. At decision block 118 there is a determination if the send all accounts has been selected. If so, there is a normal transmit operation initiated at shown at block 130. If not, there is a determination whether the PC link is enabled via NVM as illustrated at block 120 with the option to send accounting data file data to a printer as shown in block 122 or to send accounting data to the PC as illustrated in block 124.

Figure 7:
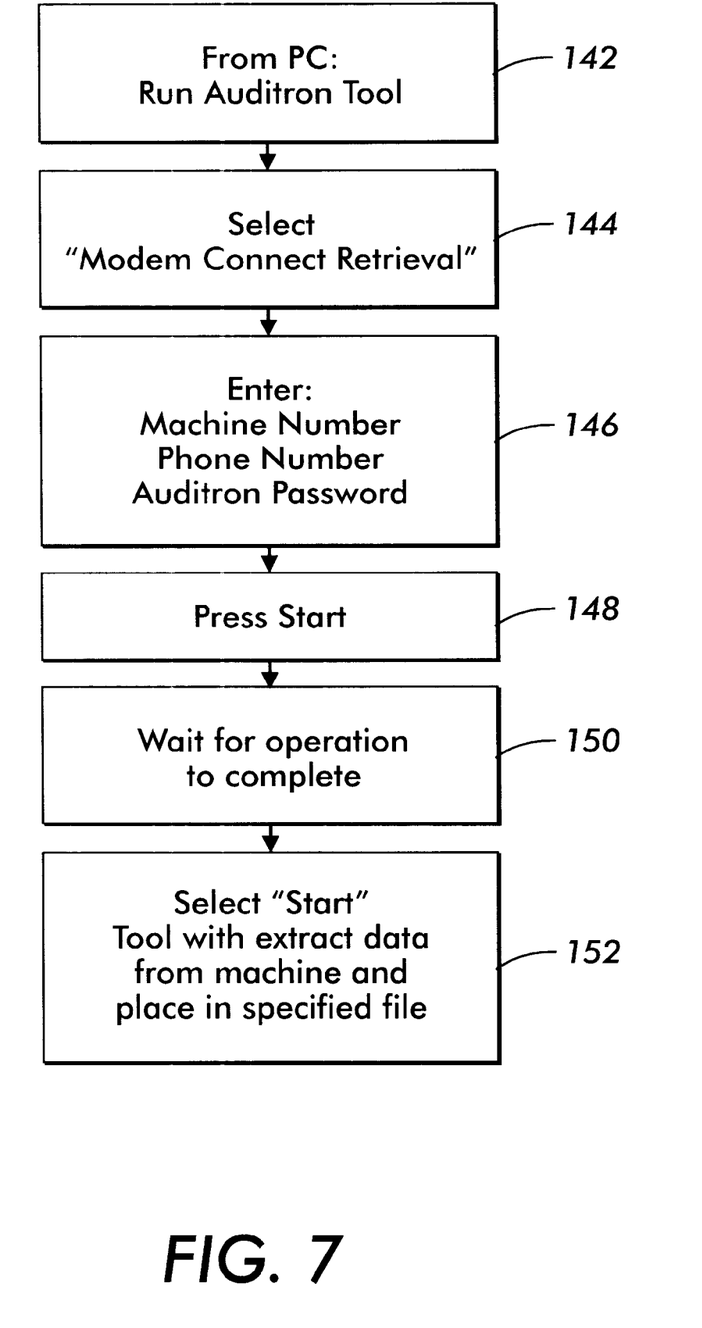

With respect to FIG. 7, there is illustrated a data transfer to a PC via phone lines. In particular from the PC there is selected a run auditron tool as shown in block 142, the step of select "modem connect retrieval" shown in block 144, and enter machine number, phone number, and auditron password as illustrated in block 146. At block 148 there is press start, and wait for operation to complete as shown at block 150. In block 152 the operations select start will extract data from the machine and place in a specified file.

Figure 8:
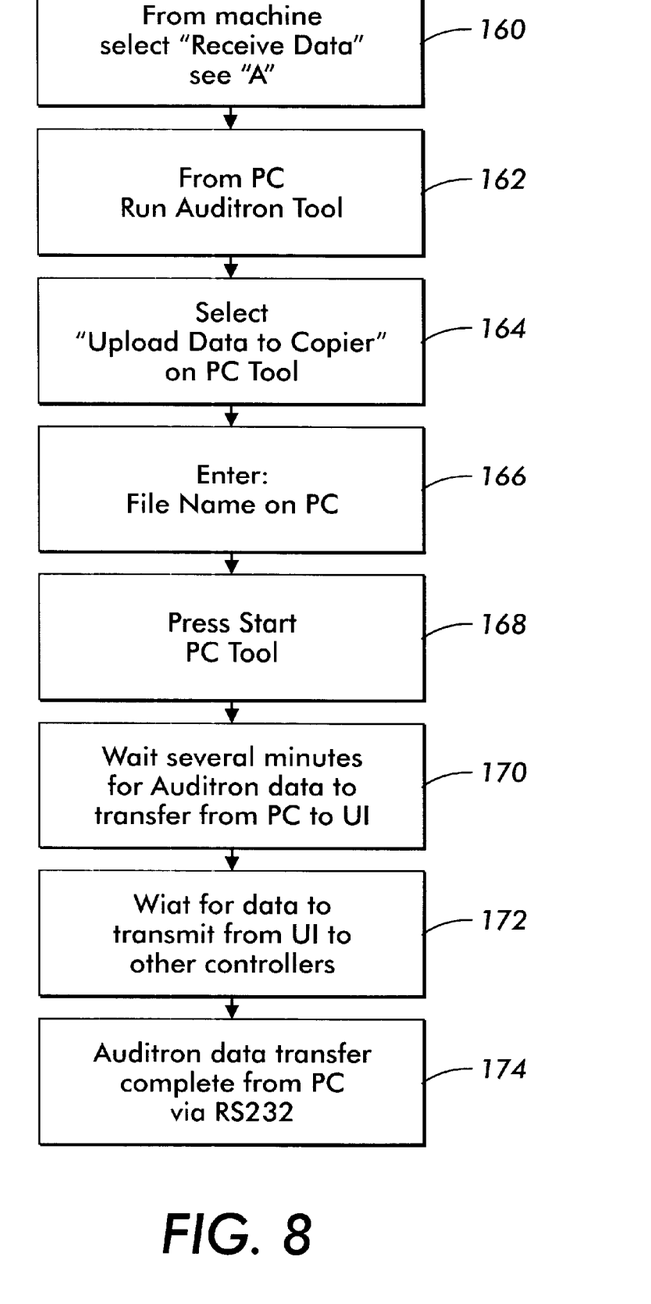

With reference to FIG. 8, there is illustrated a data transfer to a machine from the PC. From the machine there is a select "receive data" at block 160 as illustrated at "A" in FIG. 6. This operation triggers the PC to run the auditron tool as illustrated at block 162 and to select "upload data to copier or machine" on the PC auditron tool as shown at block 164. At block 166 the filename on the PC is entered and press start for the PC auditron tool illustrated at block 168. There is a delay for the auditron data to transfer from the PC to the UI of the machine as illustrated at block 170 and at block 172 a delay for data to transmit from the UI to appropriate controllers. Finally, the auditron data transfer data is complete from the PC to the machine as illustrated in block 174.

While the invention has been described with reference to the structure disclosed, it is not confined to the details set forth, but it is intended to cover such modifications or changes as may come within the scope of the following claims.

What is claimed is:

1. In a stand alone imaging machine having an auditron billing indicator, memory, and an external port, a method of providing auditron billing data to a computer for a given user comprising the steps of:

collecting machine auditron billing data in the memory during operation of the machine, setting the machine for transmission of the machine auditron billing data to the computer, transmitting the machine auditron billing data to the computer for the given user, and converting the machine billing data into a billing format compatible for the given user at the imaging machine location.

2. The method of claim 1 wherein the step of converting the machine auditron billing data into a format compatible for the given user includes the step of converting to a generic ASCII type file format.

3. The method of claim 1 wherein the step of converting the machine auditron billing data into a format compatible for the given user includes the step of converting to an MS Excel format.

4. The method of claim 1 wherein the step of transmitting the machine auditron billing data to the computer for the given user includes the step of transmitting the data to a local computer through an RS232 port.

5. The method of claim 1 wherein the step of transmitting the machine auditron billing data to the computer for the given user includes the step of transmitting the data remotely through a modem.

* * * * *